United States Patent [19]

Buttarelli

[11] 4,018,591

[45] Apr. 19, 1977

[54] PRODUCT FOR ACTIVATING AND POTENTIATING VEGETABLE METABOLISM AND FOR CONDITIONING AGRICULTURAL SOIL AND METHOD FOR THE PREPARATION THEREOF

[75] Inventor: Luigi Buttarelli, Milan, Italy
[73] Assignee: Prodotti Gianni S.r.l., Milan, Italy
[22] Filed: Dec. 11, 1974
[21] Appl. No.: 531,703

Related U.S. Application Data

[63] Continuation-in-part of Ser. No. 154,194, June 17, 1971, abandoned, which is a continuation-in-part of Ser. No. 780,913, Dec. 3, 1968, abandoned.

[52] U.S. Cl. .................................. 71/23; 71/27; 71/64 C; 71/64 SC
[51] Int. Cl.$^2$ .................................. C05F 11/00
[58] Field of Search ............... 71/1, 23, 9, 11, 24, 71/25, 27, 6 HC, 64 SC; 106/123 LC; 260/124, 124 A

[56] References Cited

UNITED STATES PATENTS 2,130,668  9/1938  Günther .................. 260/124 A

Primary Examiner—Frank A. Spear, Jr.
Assistant Examiner—Ferris H. Lander
Attorney, Agent, or Firm—Shlesinger, Fitzsimmons & Shlesinger

[57] ABSTRACT

A fertilizing and soil-conditioning agent is disclosed which is obtained by interaction of lignin (or derivatives thereof such as lignin-sulphonates) with an alkanolamine, preferably a lower aliphatic alkanolamine. The product thus obtained is water soluble and considerably improves the amount and the quality of the crops, while concurrently improving the texture of agricultural soil treated therewith.

11 Claims, No Drawings

PRODUCT FOR ACTIVATING AND POTENTIATING VEGETABLE METABOLISM AND FOR CONDITIONING AGRICULTURAL SOIL AND METHOD FOR THE PREPARATION THEREOF

This application is a continuation-in-part of my application Ser. No. 154,194, filed June 17, 1971, which in turn is a continuation-in-part of my application Ser. No. 780,913, filed Dec. 3, 1968, both abandoned.

The lignins and their derivatives, such as the lignin-sulphonates are well known products which find application in various and many fields of engineering and of industry, such as for instance in ceramics, plastics, as additives in storage cells and so on.

It is well known too that the lignins in nature contribute to the formation of humic substance in the soil. Such formation is however subject to the presence of especially favorable temperature conditions and takes place in an alkaline and oxidizing environment and in the presence of nitrogenous substances. In nature this transformation takes place however in a very long lapse of time.

The lignins for industrial production, to wit those obtained from alkaline processing operations for the reduction of wood into pulp, and precipitated by means of acids and recovered thereafter through filtering operations, cannot however be employed usefully in the agriculture practice as activating agents for vegetation or as conditoning agents of the soil, inasmuch as said lignins are water insoluble and poorly soluble in alkalies, and therefore when introduced as such in the soil do not act, or display weak action.

The lignin-sulphonates of alkali metals and of alkaline earth metals, such as sodium, potassium, ammonium, magnesium, calcium, and so on are instead soluble in water, and, moreover, they have especially remarkable surfactant and dispersing properties. They are products of the salification of the lignin.

Applicant has found that the lignin-sulphonates of alkali metals, especailly in case they are obtained from pure lignins free from carbohydrates, hemicellulose, and from any other decomposition product, can find excellent and advantageous application in agricultural uses as activating and potentiating agents of vegetal metabolism and as conditioning agents of the soil.

A lignin, which is well suited as a raw matter, shows for instance the following features:

| | | |
|---|---|---|
| humidity | 4.3 | percent |
| ashes | 0.4 | percent |
| methoxyl | 13.9 | percent |
| sulphur | 1.4 | percent |
| pH | 3.4 | |
| apparent density | 0.4 | kg/dm$^3$ |
| specific gravity | 1.3 | |

The values given above, but for humidity, relate to the anhydrous product.

The action of these products in their use in the agricultural field has proved to be manifold and a very efficient one. This action is mainly based on their surfactant properties which allow the products to activate the physiological functions of the vegetation inasmuch as they favor exchange relations among the nourishing elements, contained in the soil, and the roots of the plants, substantially increasing the absorption power of the roots. Inasmuch as the products are free from carbohydrates, hemicellulose and any other decomposition product, the products exhibit a great ability to withstand the assaults of the microorganisms contained on the soil, aggressions which would degrade the products.

From what has been said above it is apparent that the action of the lignin-sulphonates of alkali metals in the agricultural field cannot be compared with that of fertilizers which give straight addition of nutritious substances; but they display an activating and potentiating action as to exchange between the nourishing elements already contained in the soil and the roots of the cultures, increasing the absorption capabilities of these nutrient elements on the part of the roots.

Another advantageous feature of the lignin-sulphonates of the alkali metals is that of developing in the presence of an alkaline atmosphere excellent effects on the trace elements (iron, copper, zinc, magnesium and so forth) which in this manner can be more easily absorbed by the roots.

The lignin-sulphonates of alkali metals have besides a sequestering activity for calcium, which activity is at the utmost within the values of pH from 7 to 8. In the agricultural soils having a high content of lime the removing of calcium gives rise to: — partial destruction of the earthy glomerules, colloidal dispersion of the single particles, decreasing the volume of void spaces and therefore of the permeability, increase of hydric absorption, contraction of the water mobility, increase of phosphor in solution, decrease of the calcium concentration.

Accordingly there occur the following changes in the physiological processes of the plant: decrease of hydric consumption, increase of the phosphor absorption, decrease of the Ca absorption, lowering of the ratio Ca: $P_2O_5$, decrease of the ratio Ca: Mg and consequential benefit for the cultures.

Another important feature of the application in agriculture of the lignin salts mentioned above is represented by their characteristic of favorably conditioning the soil, which characteristic eases and integrates their activating and potentiating action mentioned above and which displays itself especially in the case of too loose earths or too calcareous ones.

The action is distinguished by the deflocculation of the clays brought about by the products being discussed.

The lignin-sulphonates of alkali metals owing to their high grade of absorption of ultra-violet rays with a coefficient decreasing from 220 to 260 millimicron and a coefficient of absorption increasing to a maximum as great as 281 millimicron have futhermore the property of keeping the surface microflora of the ground from the destroying action of the ultra-violet rays. Besides, tests effected with an aqueous solution at 2 percent of the products being discussed exposed to the sun in a glass vessel have shown generally a greater heat absorption of 5° C with respect to water.

However, in order to achieve advantageous results in the growth of plants, repeated treatment over many years are required, with the use of massive amounts of lignins or their derivatives so as to reach economically unacceptable levels. This fact limits or precludes their use in agricultural practice.

On the basis of researches and tests, however, applicant has found, and this is the subject matter of the present invention, that by combining either lignin or lignin sulphonates, with alkanolamines of the aliphatic series, a product is formed which has the features of encouraging a quick and luxurious growth of vegetable cultures in soil, even in the poorest soils, and which is efficient at low dosages, so that such a product has particular utility and great efficiency for agricultural uses.

Accordingly the primary object of the present invention is to provide a composition based on salts of alkanolamines and lignins and derivatives thereof which is of especial utility and great efficiency in agricultural use.

This novel product is prepared by combining lignin or a lignin derivative, with an alkanolamine for 7 to 15 days at ambient temperature, unless higher temperatures and/or the use of appropriate catalyst may shorten the indicated time, until an oily, fairly viscous, alkaline solution is obtained, and then keeping it out of the contact with air or any other source of oxygen, until the product is to be dispensed to the soil.

Otherwise stated, the product of the present invention is prepared by admixing under stirring the reactants at a temperature lower than that of thermal decomposition of the lignin (or lignin derivative) for the time needed to obtain a total solution; more particularly the temperature can vary between the room value and 55° C and the time is accordingly varying from about 15 days at room temperature up to about 30 hours at 50°–55° C.

In the course of the reaction the absorption of oxygen and the evolution of ammonia is noticed and these phenomena tend to continue even after a complete solution is obtained. However, according to the applicant's finding, the activating and potentiating action of the product occurs as long as the oxygen absorption and the ammonia evolution take place, whereas this action is not experienced if the above mentioned solution is left into free oxygen exchange contact with any oxygen source.

To sum up, according to the present invention, the claimed product consists of an oily, fairly viscous solution having a more or less alkaline reaction according to the ratios of the starting reactants, namely lignin (or lignin sulphonate) and alkanolamine, and capable of absorbing oxygen and evolving ammonia.

Without having it construed in limitative sense, it is the appliants's opinion that the admixing of the stated reactants cause an internal oxidizing-reducing reaction to take place in the lignin component and that this reaction continues within the soil, causing the activating and potentiating effect to occur. If however the solution of the reactants is not prevented from coming into contact with any oxygen source, and mainly with the outer air, this reaction is completed before having the product dispensed to the soil and the aforementioned effect is not revealed. It is to be noticed that the preparation of the solution is preferably carried out in presence of air, which serves to start the oxygen absorption and ammonia evolution which is thereafter blocked until the product is dispensed to the soil.

In turn the method for preparing the novel composition according to the present invention, comprises the steps of combining the lignin or a derivative thereof, preferably a lignin-sulphonate, with a lower, aliphatic alkanolamine, selected from the group consisting of mono-, di- and tri-ethanolamine, and mono-, di- and tri-isopropanolamine, the weight ratio between the lignin constituent and the alkanolamine being between 1 to 9 and 1 to 1, the reaction being effected under stirring at a temperature between room temperature and 55° C until an oily, fairly viscous, complete solution is obtained, the reaction taking place with oxygen absorption and ammonia evolution, and then storing the said solution, still capable of absorbing oxygen and evolving ammonia, out of the contact with any oxygen source, preferably in a container impervious to the air oxygen, until the solution is to be dispensed to the soil.

The time needed for the preparation of the product of the present invention is that necessary to achieve a complete solution of the lignin or lignin-sulphonate into the alkanolamine and, in fact, the higher is the temperature, the shorter is the needed time. In practice this time varies from about 30–40 hours at 50°–55° C up to 7 to 15 days at room temperature.

As regards the storage of the composition according to the invention, containers made of polyethylene or polypropylene or multy layer laminated plastics, (e.g. those including an aluminium foil laminated to a plastic) are preferred.

This novel composition on the basis of alkanolamine salts appears in a very viscous form and has a pH varying from slightly a stronger alkaline depending on the excess of alkanolamine used in the reaction with regard to the stoichiometrical ratio. By way of indication only it may be said that the proportions may be varied from 1 part of alkanolamine to 1 part of lignins or derivatives to 10 parts of alkanolamine for 1 part of lignin, even if in some cases an excess of lignin could be used.

The composition is very soluble at all proportions in water and in the alcohols and is not soluble in the organic solvents.

In its practical employment the composition is thinned into water at 5–20 percent nearly.

The alkanolamines utilized can be mono-, di- and tri-ethanolamines, mono-, di- and tripropanolamines and so forth. The triethanolamine has proved to be especially suitable.

As a derivative of the lignin the lignin-sulphonate may be advantageously used.

The composition of salts of alkanolamines and lignins or derivatives thereof according to the invention has all of the properties of the lignin sulphonates of alkali metals and furthermore exhibits the effective capability of allowing so many of the nourishing elements of organic and inorganic kinds contained in soil normally in the state of insolubility, to be assimilated in soluble form on the part of the radical system, in a more straight-forward and complete manner. It is known indeed that the roots of the plants concurrently to the absorption function, develop a secretion activity by means of which there are eliminated small amounts of organic acids. To such organic acids is reckoned the purpose of making soluble the nourishing elements thus allowing the absorption through the roots.

The composition according to the instant invention by making soluble the nourishing element contained in the soil places therefore said elements at the straightforward disposal of the roots for absorption.

The salts of alkanolamines and lignins or their derivatives have furthermore the capability of modifying the physical condition of soils by improving their state of aggregation and imparting therefore to them a more stable structure. This capability has a great importance from the agricultural standpoint both as regards the husbandry operation and the cultures proper (circulation of air and water in the ground, activation of microbiological reactions and the like).

The mechanism of the action of the salts of alkanolamines may be construed in the following manner. An optimum texture of soil, as is known, is obtained by the union of several particles (sand, silt, clay) which make up the soil into lumps which should afford a fair resistance when subjected to the washing out action of water. On the other hand, it is known that the formation and the maintenance of the state of aggregation are controlled by the organic substances which exert on the structure a twofold action.

1. Binding the clay particles into stable porous clots (lumps) which remove the clay fraction from dispersion (which in winter causes mire formation and asphyxia) and coagulation (which in summer brings about an exceedingly compactness and shrinkage of the volume).

2. Connecting together, by means of the humic compounds, the particles having the largest size (silt, sand) avoiding in this manner the damage brought by an exceeding looseness of the soil (dispersion of water, washing out of the nourishing substances).

The function of the organic substance, as a regulating factor of the structure of the soil, is then of paramount significance and it is in this function that the salts of alkanolamines exert themselves with stabilizing effect. When the composition according to the instant invention is distributed into the ground in aqueous solution, the salts of alkanolamines exert a solvent action on the organic compounds of the humus, distributing them uniformly on the surface of the mineral particles. The better distribution of the organic substance in this manner causes formation of a more homogeneous state of aggregation of the porous structure and one more stable with the possibility of better aeration. The product obtained from the combination of lignin or a derivative thereof with alkanolamines is soluble in water and alcohols.

Since aqueous solutions of the salts of alkanolamines have a freezing point so much lower than that of water (from $-5°$ C to $-10°$ C) there arises too for the soil a protective action against freezing. Furthermore said solutions of salts of alkanolamines have a very high boiling point and owing to this feature water losses, because of evaporation, are decreased from 30 to 40 percent.

Many investigations in the field concerning different cultures have confirmed the optimum properties of the compositions of salts of alkanolamines and lignins or derivatives thereof in use in agriculture.

A few examples of preparation of the product are set forth hereunder.

1. One kilogram of lignin and nine kilograms of tri-ethanolamine have been admixed at ambient temperature until a uniform suspension has been formed. The mixture is allowed to stand for a few days, preferably for a period of time from 7 to 15 days. A certain evolution of ammonia and absorption of oxygen are observed and a fluid product is obtained which, distributed in the soil, actively promotes the development and growth of plants.

The procedure is similar with different ratios of lignin to triethanolamine.

2. Two kilograms of lignin sulphonate and five kilograms of triethanolamine are admixed and allowed to stand until a complete solution is formed, at room temperature, preferably for a time of from 10 to 15 days. Ammonia is evolved and a simultaneous oxygen absorption is noted. The product obtained, distributed into the soil in small dosages, is highly efficient in promoting plant growth.

3. One kilogram of lignin and three kilograms of tri-ethanolamine are admixed, by maintaining the temperature at 55° C for 30 hours. Ammonia evolution and oxygen absorption are experienced, and a product is formed which, when distributed into the soil in small dosages, is capable of promoting vegetable growth.

4. One kilogram of lignin sulphonate and two kilograms of triethanolamine are admixed together, while keeping the temperature at 50° C for 40 hours. Ammonia evolution and oxygen absorption are experienced; and a product is formed which, distributed into the ground in small dosages, improves the growth of plants.

5. One kilogram of lignin sulphonate and three kilograms of monoethanolamine are admixed together and allowed to react with one another according to Example 1, the result being a product which is active towards the growth of plants.

6. The same general procedure has been followed as in Examples 1 and 4, the difference being that, instead of triethanolamine, other alkanolamines have been employed, such as diethanolamine, monopropanolamine, di-isopropanolamine and others.

In certain cases, to facilitate the preparation of the products indicated above, lignin (or lignin sulphonate), prior to being brought into contact with triethanolamine, has been either dispersed, or dissolved, in water. The amount of water used has never exceeded, on a volume basis, the ratio of 10 to 1 with respect to triethanolamine. Should the ratio be increased, lignins tend to precipitate.

To the ends of its practical use, in terms of distribution into the agricultural soil, the product can be used both as such and diluted, for example in water, or, as an alternative, incorporated into any solid support whatever, provided that the latter be compatible with the soil.

The product thus obtained shows, in soil, an actual capability of solubilizing, in a quick and efficient way, the inorganic and organic nutritional components of the ground which are usually in a condition of insolubility, thus making possible a quicker and more efficient assimilation thereof by the plant roots.

The function of organic substances as a regulating factor for the structure of the soil, is of paramount importance. This function, in practice, is, however, restricted by the fact that the organic substances which are present, in practice, in the soil, are not evenly distributed therein. To this limiting factor for the beneficial action of the organic substances, a remedy is offered by the product of this invention, which, by solubilizing and rendering movable the organic substances, determines a redistribution thereof and thus acts in such a way that the organic substances are enabled to unfold their beneficial action in the soil.

The improved distribution of the organic substances thus obtained encourages the formation, in the soil, of a more homogeneous state of aggregation, which exhibits a porous and more stable structure, the aeration of the soil being thus improved.

The inventive product exhibits, in addition to its action of solubilization towards organic substances, also a similar action towards inorganic substances.

A certain capillary-active action, exhibited thereby, acts in such a way that it becomes easier, for the plant roots, to draw in the nutritional juices which have been previously solubilized by the product. The product has also an oxygen-absorbing action, a fact which implies a better aeration of the soil and, concurrently, it is capable of setting ammonia free. These phenomena are such as to enable one to surmise that the product may contribute towards the formation of humic compounds in the soil. Consequently, the growth of the roots is encouraged, along with their absorption capability, the same being true of leaf and vegetative growth. Thus the overall agricultural produce is markedly increased.

Numerous laboratory and field tests on different cultures have confirmed the outstanding properties of the product obtained according to the invention in its agricultural applications. It has proven to be nontoxic both for humans and animals. It gives rise to no phytotoxicity as it is spread in the ground.

To simplify, in the following examples of laboratory and field tests, the symbol LT $x/y$ will connote the product obtained by the interaction of lignin and triethanolamine, wherein $x$ is the fraction by weight of lignin and $y$ the fraction by weight of triethanolamine. Likewise, the symbol LST $x/y$ will connote the products whose starting materials are a lignin sulphonate and triethanolamine.

1. Solubilization tests of organic and inorganic substances of the soil

Numerous tests have been made by treating soft soils, soils of medium texture and compact soils, having various contents of organic substances, with different LT or LST products having a high percentage of triethanolamine, such as LT 5/95 and LST 10/90.

After 10 days, by filtration, solutions more or less intensely colored, from yellow to brown, have been obtained, according to the contents of organic substances contained in the treated ground. The solutions thus obtained have been analyzed to determine the percentage contents of organic substances.

The analyses which have been made show that substantial amounts of organic substances were contained in solution, along with inorganic substances, such as phosphorus, potassium, zinc, iron, copper, cobalt, molybdenum, tin, nickel and magnesium.

2. Solubilization of metals

Numerous tests have been carried out with the products prepared according to the examples, in which several metals showing an interest from an agricultural standpoint, such as trace elements, have been brought into contact with the products for a period of 15 days. While these metals are not appreciably dissolved in water, they, conversely, are considerably dissolved in the products prepared according to the examples aforementioned. The following metals were tested: copper, zinc, cadmium, manganese, bismuth, cobalt, iron, vanadium, nickel, tin. The solutions, spread on soils, exhibited a considerable promoting effect on the vegetative growth, more particularly in those soils in which the particular elements with which the product was enriched were lacking.

3. Laboratory test on germinating seeds

Wheat from recent crops, placed on filter paper on Petri capsules, has been treated by imbibing the filter paper with a solution of LST with various proportions of lignin and triethanolamine at a concentration of 1 pro mille in water. It has been possible to observe a germination speed of wheat which is considerably greater than that of the controls (filter paper imbibed with plain water).

Similar results have been obtained by substituting, for the interaction, diethanolamine or monoethanolamine, for ethanolamine. The most conspicuous characteristic action, also in there cases, was quicker stimulation of germination.

4. Laboratory tests on pot cultures

Orchard cultures, wheat, trefoil, have been treated with aqueous solution of LT and LST in various proportions. An advance of leafing of several days has been obtained and a longer putting forth length have been experienced as compared with the untreated controls.

As an average, with the use of the inventive products a diameter increase of the stalks has been obtained and the total produce has been increased, on a weight basis, in the order of magnitude of from 35% to 100%.

5. Demonstration test on greenhouse cultures

The test has been effected in a glass greenhouse which had been limitedly heated and on a strip of ground having a high softness and porosity, rich with organic substances (due to the abundant distribution of ripe manure) and with mineral nutritional elements (due to generous fertilization with a complex fertilizer which contained phosphorus, nitrogen and potassium, along with trace-elements).

The strip has been divided into 13 squares of equal surface area, three of which, placed at the center and the sides, have been used as controls. In the squares equal amounts of seeds of spinach and beet have been sown, the day Dec. 19, 1967.

After two days, the test squares have been treated with aqueous 10% solutions of the products: LST 25/75; LST 50/50, LST 75/25 and in dosages corresponding to 75 and 150 kgs. of product per hectare. These products have been dispensed with a usual watering can on the surface of the squares. Both the treated squares and the controls have been evenly and regularly watered.

On Jan. 26, 1968 a conspicuous advance of putting forth has been noted in the squares treated with LST 50/50. On Feb. 19, 1968 there has been noted an apparent advance in putting forth and growth in all of the treated squares in comparison with the control squares. Such a difference in favor of the treated squares has become exalted with LST 50/50. Crops were collected between Mar. 29, 1968 and Apr. 8, 1968 for spinach, and between 16 and Apr. 23, 1968 for beets.

On Mar. 29, the best 10 seedlings of spinach have been collected in each treated and control square. The seedlings taken from the treated squares weighed about twice those of the untreated squares. On Apr. 8, the whole spinach crop was collected. The unit weight of the seedlings of the control squares was 4.74 grs. as an average, the unit weight of the seedlings of the treated squares was 6.96 grs. as an average. The average weight increase of the crop was 47%. The highest increase has been found (as anticipated since the initial advance of putting forth and the constant quicker growth) in the square treated with LST 50/50 at the highest dosage, that is, 150 kgs. of product per hectare. In this square the average weight of the seedlings was 8.23 grs., the increase being 73%.

Also the beet crop gave best results with peaks in the favor of the treated squares, the average weight increase being 50%.

6. Demonstration field tests carried out during the month of June, 1967.

a. The test squares had a surface of 40 sq. meters each (2×20) and were divided into two equal portions, one half of which was oriented northwards, the other half southwards. On completion of the necessary operation for preparing the soil, that is, plowing, harrowing, fertilization (with mineral perphosphates and Thomas meal) and subdivision of the squares, by considering the southward portions as controls, the procedure was the following:

1st square: the northern portion was treated with 100 grs. of LT 15/85 (equivalent to a dosage of 50 kgs/hectare).

2nd square: the northern portion was treated with 100 grs. of LST 50/50 (equivalent to a dosage of 50 kgs/hectare).

3rd square: the northern portion was treated with 200 grs. of LT 25/75 (equivalent to a dosage of 100 kgs/hectare).

4th square: the northern portion was treated with 200 grs. of LST 25/75 (equivalent to a dosage of 100 kgs/hectare).

5th square: the northern portion was treated with 300 grs. of LT 50/50 (equivalent to a dosage of 150 kgs/hectare).

The treatment was carried out with aqueous solutions having a concentration ranging from 5% to 10% approximately, and the spreading took place by means of the usual power spraying machines.

The square No. 1 was sown with spinach, the square No. 2 with transplanted tomato seedlings, the square No. 3 with lettuce, the square No. 4 with parsley and the square No. 5 with Naples lettuce.

Immediately after, the squares were watered.

The results have been the following:

Putting forth — In all of the treated squares, an advance of putting forth or germinations was noticed, along wth a greater uniformity as compared with the controls.

Growth — All the plants sown in the treated squares showed a much better growth than the controls.

Spinach had a growth almost three times that of the controls.

Tomatoes had a much greater growth in the treated square as regards the stalk (15 mm. dia. against 8 mm. of the control), as regards the leaves (length 140 mms. and width 60 mms. as compared with a length of 90 mms. and a width of 45 mms. of the control).

The fruits were better developed in the treated square as compared with those of the controls (weight increase from 20% to 30%).

Lettuce had positively more favorable growth (about twice) than the control. In addition, in the control square, the leaves showed a slight chlorosis, while the leaves in the treated square had a dark green color.

The Naples lettuce showed the same favorable results as the other cultures: in addition, the lettuce was tenderer in the treated square.

The positive results of the demonstration field tests carried out in 1967 have been fully confirmed in further tests carried out in the same area on a similar ground.

b. Test with LST 50/50: dosage of 300 kgs/hectare.

Crop increase 35% on compact ground, for lucern and clover, and of 50% to 100% for basil. Vegetative increase on the same soil: of 50%, with the same product for transplanted tomato seedlings, and of 100% on transplanted pimento seedlings and salad chicory.

c. Test with LST 25/75: dosage of 300 kgs/hectare.

An apparent improved vegetative development on compact soil, for roses in situ about 6 to 7 years.

d. Tests with LT 15/85 and LT 25/75. Dosage of 500 kgs/hectare.

A quick acceleration of growth, on compact ground; on one-year meadows, a vegetative increase of more than 200%; thickening and growth which could be evaluated visually; positive increase in the green color of areas which were chlorotic due to asphyxia or nutritional depletion. A similar result was obtained for the same products on golf greens (increase of the green color and thickening).

e. Tests with LT 10/90 and LT 25/75. Dosage of 400 kgs/hectare.

100% sprouting (against 50% of control) on compact ground, for recently transplanted maple seedlings.

f. Tests with LT 20/80 and LST 10/90. Dosage variable from 200 to 400 kgs/hectare.

A decided takeup of the vegetative cycle with increase of green color, in grounds of medium texture and compact soils, for geraniums, lagerstroemias, peach and cupressus, as compared with controls which were starving, that is, chlorotic and with poor growth.

It should be borne in mind that, in the tests reported above, the higher dosages have been essentially adopted in order to make more rapidly conspicuous the action of the products used. It has been ascertained, however, that by employing lower dosages the same results are obtained but after a longer time. At any rate, this length of time is always encompassed in the vegetation cycle of the culture concerned.

Tests carried out on different cultures and soils have given positive results with the most varied proportions of lignins (and derivatives thereof) and alkanolamines. From the tests which have been carried out, it has been ascertained that the most favorable ratios of lignin (or derivatives thereof) to alkanolamines are between 10 parts of lignin (and derivatives thereof) and 90 parts of alkanolamine, and 50 parts of lignin (or derivatives thereof) and 50 parts of alkanolamine. It should be assumed, however, that other ratios could prove profitable as a function of different characteristics of the soil.

In summation, the results reported above show that the products obtained by interaction of lignins and their derivatives with alkanolamine, more particularly triethanolamine, exert a strong action on the growth of leaves, roots and fruits, the final result being a considerable crop increase. The treated plants show an attractive green color and the crops obtained from treated soils have better flavor and taste characteristic than corresponding crops obtained from untreated soils. In addition, in cultures of the treated soils, a reduction of the vegetative cycle has also been noticed.

Having thus described my invention, what I claim is:

1. A viscous oily product for conditioning and potentiating vegetation and for fertilizing soils obtained by combining under stirring an organic substance, selected from the group consisting of lignin, obtained by the alkaline processing of wood into wood pulp, and of lignin derivatives, with a lower aliphatic alkanolamine selected from the group consisting of mono-; di-, and tri-ethanolamine, and mono-, di-, and tri- isopropanolamine, and their mixtures, to get a uniform distribution of the components, the weight ratio between the two reagents being between 1 to 10 and 1 to 1, the reaction being effected at a temperature between room temperature and 55° C, until a total solution is obtained, the product having alkaline reaction, and having the characteristic of being capable of absorbing oxygen and evolving ammonia, when exposed to air, and dissolving a metal selected from the group consisting of copper, zinc, cadmium, manganese, bismuth, cobalt, iron, vanadium, nickel and tin, in the reaction product.

2. A method of making a viscous alkaline oily product for conditioning and potentiating vegetation and for fertilizing soil, comprising reacting lignins or their derivatives, with a lower aliphatic alkanolamine selected from the group consisting of mono-, di-, and tri-ethanolamine, and mono-, di-, and tri-isopropanolamine, the weight ratio between the lignin reactant and the alkanolamine being between 1 to 10 and 1 to 1, the reaction being effected at a temperature between room temperature and 55° C, the reaction taking place with absorption of oxygen and evolution of ammonia, until an oily, fairly viscous, total solution is obtained, and then storing the said solution, while it is still capable of absorbing oxygen and evolving ammonia, out until the solution is to be dispensed to the soil.

3. The method according to claim 2, wherein the reaction time is comprised between 30–40 hours at 50°–55° C and 7 to 15 days at room temperature.

4. The method according to claim 2, wherein the reaction product is airtightly stored in a container of a material impervious to the air oxygen.

5. The method according to claim 2, wherein the lignin derivative is selected from the group consisting of lignin sulphonates of alkali metals and alkaline earth metals.

6. The method according to claim 5, wherein the lignin sulphonate is selected from the group consisting of lignin sulphonates of sodium, potassium, magnesium, ammonium and calcium.

7. The method according to claim 2, wherein the lignin or lignin derivative is dispersed in water prior to its being brought into contact with the alkanolamine, and the amount of water does not exceed, on the basis of volume, the ratio of 10 to 1 with respect to the amount of alkanolamine employed in the reaction.

8. The method according to claim 2, wherein a metal selected from the group consisting of copper, zinc, cadmium, manganese, bismuth, cobalt, iron, vanadium, nickel and tin is dissolved in the reaction product obtained according to claim 3.

9. The method of conditioning and potentiating vegetation and fertilizing soils, comprising reacting an organic substance selected from the group consisting of lignin, lignin sulphonates, and their derivatives, with a lower aliphatic alkanolamine selected from the group consisting of mono-, di-, and tri-ethanolamine, and mono-, di-, and tri-isopropanolamine, the weight ratio between the lignin reactant and the alkanolamine being between 1 to 10 and 1 to 1, the reaction being effected at a temperature between room temperature and 55° C, the reaction taking place with absorption of oxygen and evolution of ammonia, until an oily, fairly viscous, total solution is obtained, and then, while the solution is still capable of absorbing oxygen and evolving ammonia, distributing the solution on the soil that is to be fertilized.

10. The method as defined in claim 9, including the step of diluting said viscous solution with water prior to distributing the solution onto the soil that is to be fertilized.

11. The method as defined in claim 10, wherein the concentration of said viscous solution in the diluted product is in the amount of between 5 and 20 percent.

* * * * *

UNITED STATES PATENT OFFICE
CERTIFICATE OF CORRECTION

Patent No. 4,018,591          Dated April 19, 1977

Inventor(s) Luigi Buttarelli

It is certified that error appears in the above-identified patent and that said Letters Patent are hereby corrected as shown below:

On the title page, after paragraph [21], insert the following paragraph:

-- [30] Foreign Application Priority Data

December 15, 1967  Italy ------ 23946 A/67 --.

Signed and Sealed this

Eighteenth Day of October 1977

[SEAL]

Attest:

RUTH C. MASON
Attesting Officer

LUTRELLE F. PARKER
Acting Commissioner of Patents and Trademark